(12) United States Patent  (10) Patent No.: US 6,631,320 B1
Holt et al.  (45) Date of Patent: Oct. 7, 2003

(54) ELECTRONIC TRACTION CONTROL SYSTEM

(75) Inventors: Bradford J. Holt, Peoria, IL (US);
Jeffrey E. Jensen, Naperville, IL (US);
Sameer Marathe, Oswego, IL (US);
Scott A. Marks, Plainfield, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/305,619

(22) Filed: Nov. 27, 2002

(51) Int. Cl.[7] .............................................. B60K 28/16
(52) U.S. Cl. ........................ 701/83; 180/197; 180/235; 180/244
(58) Field of Search ................................ 180/197, 235, 180/244; 303/122.07, 123; 701/82, 83, 84, 90, 91

(56) References Cited

U.S. PATENT DOCUMENTS

| | | |
|---|---|---|
| 5,213,177 A | 5/1993 | May |
| 5,535,124 A | 7/1996 | Hosseini et al. |
| 5,865,512 A * | 2/1999 | Meiser et al. .................. 701/83 |
| 6,283,237 B1 * | 9/2001 | Muller ........................ 180/235 |

* cited by examiner

Primary Examiner—Richard M. Camby
(74) Attorney, Agent, or Firm—James R Smith

(57) ABSTRACT

An articulated work machine has a front frame and a rear frame connected for pivotal movement therebetween for steering the machine by an articulation joint. Each of the front and rear frames has two driven wheels, spaced laterally, each having a brake associated therewith. As the machine articulates during steering, one or more of the wheels may lose traction and slip. An electronic traction control system receives measured wheel speed signals and an articulation angle signal, calculates a desired wheel speed responsive to the wheel speed and articulation angle signals, and selectively applies the brakes until the measured wheel speed is equal to the desired wheel speed.

16 Claims, 8 Drawing Sheets

ELECTRONIC TRACTION CONTROL SYSTEM

TECHNICAL FIELD

This invention relates to an electronic traction control system for an articulated work machine and, more specifically, to an electronic control system which brakes each wheel independently and at least partially bases the brake control on the rate of articulation of the work machine.

BACKGROUND

Work machines used at construction sites and other off-road locations are often four wheel drive articulated machines. An articulated machine includes front and rear frames hinged together by an articulation joint for relative pivotal movement. When one of the frames is moved relative to the other, the machine turns. The articulation joint also moves back and forth in a known manner perpendicular to a centerline of the machine as the machine articulates, imparting an additional component of motion to the machine's turning dynamics.

Sometimes such work machines experience a loss of traction, often due to poor underfoot conditions or a change in the weight distribution of the machine. Traction loss events may also occur when one wheel of the machine spins at a very different speed than the other wheels, because that wheel is stuck in one position (therefore not spinning) or is spinning uncontrollably because the tread of the wheel cannot grip the ground. This slipping and subsequent loss of traction is undesirable in that the machine works less efficiently when slipping, and the ground surface under the machine can become rutted and damaged. The tire or wheel of the machine can also suffer physical damage or thermal wear if the wheel slips or skids.

Various mechanical traction solutions have been developed and placed in commercial use. For example, one method to prevent front or rear wheel slip involves locking the differential on the slipping axle. However, since the differential operation is then restrained and not controlled responsive to some sensed factor, the wheels are held to the same speed and articulation may be adversely effected. Some difference in left/right wheel speed is needed for the front and rear frames to articulate in an optimal manner to turn the machine.

Articulated work machines are often provided with a separately actuable brake for each wheel. These brakes can be actuated manually or automatically as needed to bring a free-spinning wheel under control, much as the automobile driver taps the brake pedal to restore traction, albeit with much more precise control.

An automatic traction control system used to actuate brakes individually is disclosed in U.S. Pat. No. 5,535,124, issued Jul. 9, 1996 to Javad Hosseini et al. (hereafter referenced as '124). The traction control system of '124 detects the difference in rotational velocity between the two wheels of the front or rear frame, detects the articulation angle of the machine (an articulation angle of zero means that the machine is not being turned), and then responsively produces a braking control signal to slow the faster rotating wheel. The '124 braking control signal takes into account the fact that one of the wheels may need to rotate more quickly if it is the outer wheel and weights the braking control signal accordingly.

The '124 traction control system, however, calculates the braking control signal using a desired speed ratio between each set of inner and outer wheels. The ratio can falsely indicate that the wheels are not slipping when there actually is a loss of traction. Missed traction events often occur if, for example, both inner and outer wheels are slipping slightly, or only the inner wheel is slipping, since the controller only checks to see if the ratio of the faster wheel speed to the slower wheel speed is greater than expected, thus ignoring the absolute wheel speeds. Also, the '124 system does not take into account the effect of the back-and-forth, or lateral, movement of the articulation joint during articulation. The portion of the wheel speed attributed to the articulation rate and the lateral movement of the articulation joint is not insignificant and can mask small losses of traction, leading the '124 traction control system to miss the wheel slipping events. Finally, the '124 system does not consider the effect of the load carried by the machine and how that load causes one or more wheels of the machine to be slightly more or less likely to slip.

The present invention is directed to overcoming one or more of the problems as set forth above.

SUMMARY OF THE INVENTION

In a preferred embodiment of the present invention, an electronic traction control system for a work machine is disclosed. The work machine has a front frame, a rear frame, and an articulation joint connecting the front and rear frames. The system includes an articulation sensor, at least two wheels, a brake associated with the work machine, and an electronic control module. The articulation sensor is adapted to provide an articulation angle signal. Each wheel is adapted to provide a wheel speed signal. The electronic control module is adapted to receive the articulation angle and wheel speed signals; calculate an articulation rate responsive to the articulation angle signal; determine a desired wheel speed having at least one of: an articulation-caused linear velocity component calculated responsive to the articulation rate, articulation angle, and wheel speed signals, and a transient articulation-caused velocity component calculated responsive to the articulation rate, articulation angle, and wheel speed signals; and responsively produce a brake signal to control the brake.

In a preferred embodiment of the present invention, an electronic traction control system for a work machine is disclosed. The work machine has front and rear frames connected by an articulation joint for relative pivotal movement. Each frame has at least one driven wheel. The electronic traction control system includes an articulation sensor associated with the articulation joint and adapted to produce an articulation angle signal, a wheel speed sensor associated with each wheel and adapted to produce a wheel speed signal, and an electronic control module. The electronic control module is adapted to receive the articulation angle signal and the wheel speed signals, determine a measured wheel velocity value responsive to each wheel speed signal, determine an articulation rate value responsive to the articulation angle signal, calculate an articulation-caused linear velocity value for each wheel responsive to the articulation angle, articulation rate, and wheel speed signals and a transient articulation-caused velocity value for each wheel responsive to the articulation angle, articulation rate, and wheel speed signals, calculate a desired wheel velocity value for each wheel responsive to the articulation-caused linear velocity value and the transient articulation-caused velocity value, calculate an error value responsive to the measured wheel velocity value and the desired wheel velocity value, and produce a brake signal for each wheel responsive to the error value. The electronic control system also includes a brake associated with each wheel, adapted to receive the brake signal and actuate responsively thereto.

In a preferred embodiment of the present invention, a method of controlling wheel slip of an articulated work machine is disclosed. The method includes the steps of: comparing the relative positioning of a front frame and a rear frame of the work machine and responsively producing an articulation angle signal; sensing a speed of at least one wheel associated with at least one of the front and rear frames and responsively producing a wheel speed signal; receiving the articulation angle signal and each wheel speed signal; producing a wheel speed value responsive to each wheel speed signal; and determining a rate of change of the articulation angle signal and responsively producing an articulation rate value. The method also includes: producing an articulation-caused linear velocity value responsive to the articulation angle signal, the articulation rate value, and each wheel speed signal; producing a transient articulation-caused velocity value responsive to the articulation angle signal, the articulation rate value, and each wheel speed signal; and producing a desired wheel speed value based on the articulation-caused linear and transient articulation-caused velocity values. Additionally, the method includes: comparing the wheel speed value to the desired wheel speed value; producing a brake signal responsive to the difference between the actual wheel speed value and the desired wheel speed value; and controlling a brake associated with each wheel responsive to the brake signal.

DETAILED DESCRIPTION

Figure 1:
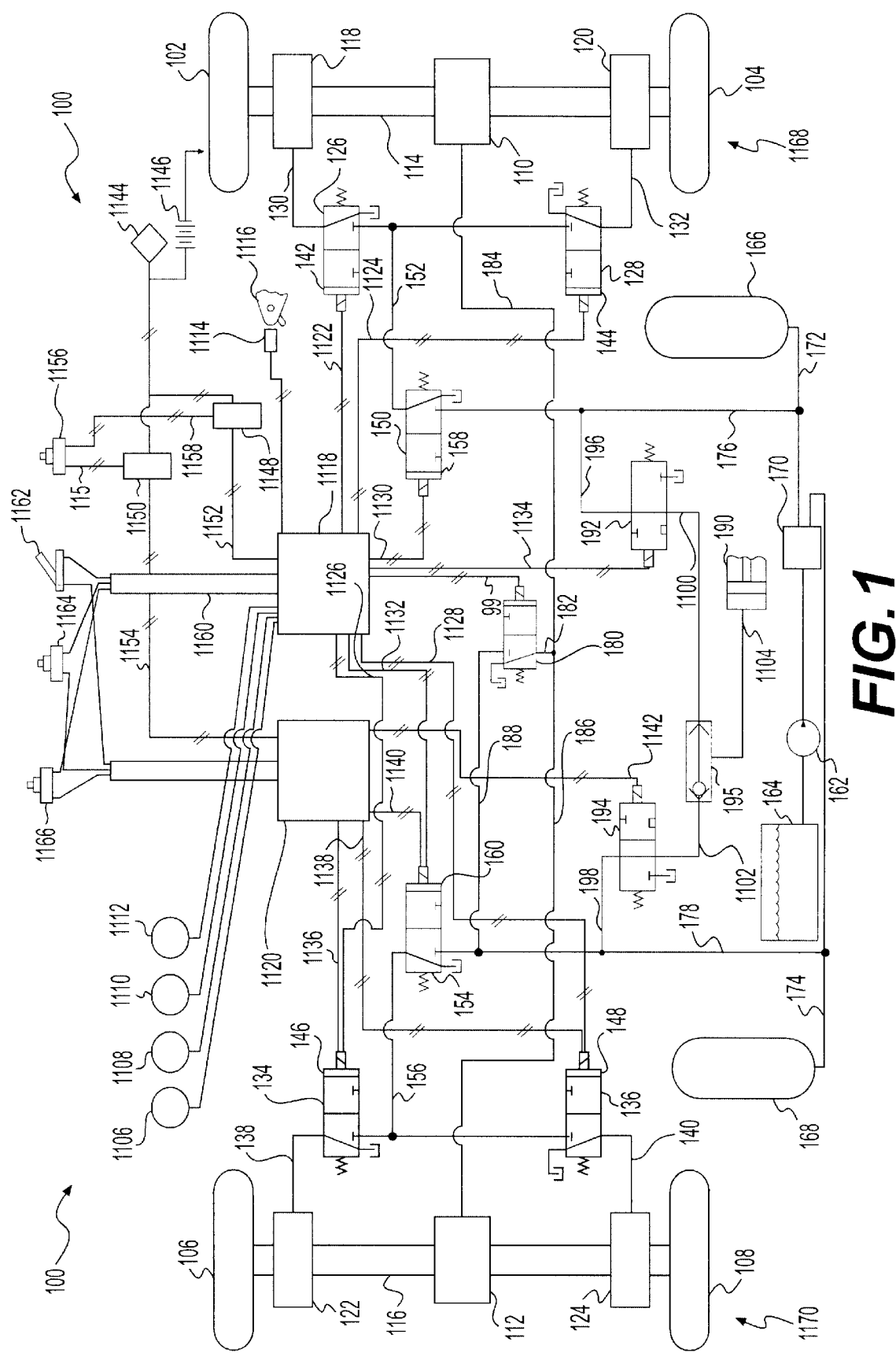
FIG. 1 is a schematic diagram of a work machine including an electronic traction control system of an embodiment of the present invention.

Referring first to FIG. 1, an electronic traction control system 100 embodying certain principles of the present invention is illustrated. Shown is a partial schematic representation of a work machine having an articulated chassis made up of a front frame 1168 and a rear frame 1170 interconnected by an articulation joint 1116 having a vertical axis about which the work machine is steered by a power steering arrangement. Wheels 102,104,106,108 are driven through differentials 110,112 of the drive axles 114,116 and hydraulically applied and spring released service brakes 118,120,122,124 are operatively associated with the wheels 102,104,106,108, respectively, to control their rotation.

A pair of electrically controlled proportional service valves 126,128 are connected in fluid delivery relation to the service brakes 118,120, respectively, by fluid conduits 130, 132 and a pair of electrically controlled proportional service valves 134,136 are connected in pressure fluid delivery relation to the service brakes 122,124 by fluid conduits 138,140. The service valves 126,128,134,136 have control elements 142,144,146,148, respectively, having fluid delivery and closed positions of adjustment. Pressure fluid delivery to the service valves 126,128 is by way of an electrically controlled proportional safety valve 150 and a fluid service conduit 152 having branches connected in parallel to the service valves 126,128. In a similar manner an electrically controlled proportional safety valve 154 is connected by a fluid service conduit 156 to the service valves 134,136. The safety valves 150,154 have fluid flow control elements 158,160, each of which have fluid delivery and closed positions of adjustment. The flow control elements 142,144, 146,148,158,160 of all the service and safety valves 126, 128,134,136,150,154 are normally in their closed positions of adjustment and are proportionally opened depending on the amount of electric current delivered to those valves.

The work machine includes a source of pressure fluid including an engine driven pump 162 drawing fluid from a reservoir 164 and delivering pressurized fluid to two accumulators 166,168 by way of a double check valve 170 and fluid conduits 172,174. The accumulator 166 is connected in pressure fluid delivery relation to the safety valve 150 by a fluid conduit 176 and the accumulator 168 is connected in pressure fluid delivery relation to the safety valve 154 by a fluid conduit 178.

Each of the differentials 110,112 has a fluid pressure applied and spring released lock-up mechanism (not shown). The lock up mechanisms of the differentials 110,112 are connected in pressure fluid receiving relation to an electrically controlled proportional lock valve 180 by a fluid conduit 182 and branch conduits 184,186 and the lock valve 180 is connected in pressure fluid receiving relation to the fluid conduit 178 by a fluid conduit 188. The differential lock-up mechanism may be a positive lock type or it may be a slip type differential lock wherein the amount of slip depends on the pressure of the fluid delivered to the lock-up mechanism. The fluid pressure delivered to the differential lock up mechanism can be varied because the lock valve 180 is a proportional valve.

The work machine is also provided with a fluid control for its spring applied and fluid pressure released parking brake 190. The parking brake 190 is connected in pressure fluid receiving relation to the accumulators 166,168 via electrically controlled parking valves 192,194 and a shuttle valve 195. The parking valves 192,194 are connected in pressure fluid receiving relation to the fluid conduits 176,178 by fluid conduits 196,198, respectively, for redundancy reasons. However, only one parking valve 192,194 and associated fluid conduits may be provided in some situations. A pair of inlet ports of the shuttle valve 195 are connected in pressure fluid receiving relation to the parking valves 192,194 by a pair of fluid conduits 1100,1102 and a fluid conduit 1104 connects an outlet port of the shuttle valve 195 to the parking brake 190.

Individual wheel speed sensors 1106,1108,1110,1112 are operatively associated with the wheels 102,104,106,108, respectively, and a steer angle or articulation angle sensor 1114 is operatively associated with the articulation joint 1116. The wheel speed sensors 1106,1108,1110,1112 will be described in greater detail below.

An electric control is provided for operating the parking valves 192,194, the service valves 126,128,134,136, the safety valves 150,154 and the differential lock valve 180, which includes an electronic control module 1118 and an optional back-up electronic control module 1120, which may be integral with the electronic control module 1118 or a physically separate controller. Electronic control modules 1118,1120 are well-known in the art, and any suitable electronic control module 1118,1120 which acts to receive the desired inputs and calculate the desired outputs may be employed. The wheel speed sensors 1106,1108,1110,1112 and the steer angle sensor 1114 are connected in signal delivery relation to inputs of the electronic control module 1118,1120. The service valves 126,128,134,136, the safety valves 150,154, the parking valves 192,194 and the differential lock valve 180 are individually connected to outputs of the electronic control module 1118 by electric lines 1122,1124,1126,1128,1130,1132,1134, respectively. The service valves 134,136 and the safety valve 154 associated with the service brakes 122,124 of the rear axle 116 and the parking valve 194 may be individually connected to outputs of the back-up electronic control module 1120 by electric lines 1136,1138,1140,1142, respectively; again, if this is done, it is for redundancy reasons unrelated to the present invention and may be connected in another manner without effecting the operation of the electronic traction control system 100.

The electronic control modules 1118,1120 are connected to two power sources, namely, an engine driven generator 1144 and a battery 1146. The generator 1144 and the battery 1146 are jointly connected in power delivery relation to, a pair of relays 1148,1150 which are in turn connected in power delivery relation to the electric control modules 1118,1120, respectively, by a pair of electric lines 1152,1154. The relays 1148,1150 are operated by a manually operated ignition type power switch 1156 which is preferably located in the cab of the work machine or another operator-accessible position (such as on a remote control device) and is connected to the relays 1148,1150 by a pair of electric lines 1158,115.

If the differentials 110,112 are equipped with positive locking mechanisms, the electronic control modules 1118, 1120 can be programmed to apply current to the proportional differential lock valve 180 commensurate with the sensed vehicle speed, thus automatically applying only the necessary force to engage the positive lock-up mechanisms. The greater the vehicle speed the smaller the force required to engage the differential lock-up mechanism, since the machine is not capable of generating as much torque to resist the differential at higher vehicle speeds. The electronic control modules 1118,1120 can be programmed to supply current to the proportional lock valve 180 corresponding to the sensed slippage of a wheel, whereby a corresponding fluid pressure is delivered to the friction clutches in the differential locking mechanisms. This mode of traction control can serve as a back-up type traction control in the event the traction control using the service brakes should become inoperative or is undesirable. The differential lock traction control algorithm will be discussed below.

In addition to the power switch 1156, the various manually operated controls may include a brake actuating mechanism, shown here as a brake pedal 1162, a differential lock switch 1164, and an electronic traction control switch 1166, each of which are adapted to provide input to at least one of the electronic control modules 1118,1120 in a known manner.

FIGS. 2, 3, 4, 6, 7, and 8 depict flowcharts collectively illustrating a computer software program for implementing a preferred embodiment of the present invention. Here, it should be noted that the wheels 102,104,106,108 are controlled independent from each other. Thus, the figures represent the control of one wheel 102,104,106,108—the other wheels 102,104,106,108 will have substantially identical flow charts. For the purposes of the following discussion, the term "inner wheel" represents the inside turning wheel and "outer wheel" represents the outside turning wheel. If the machine is not turning, then the inner wheel represents the left wheel, while the outer wheel represents the right wheel.

Electronic Traction Control System Mode Selection

Figure 2:
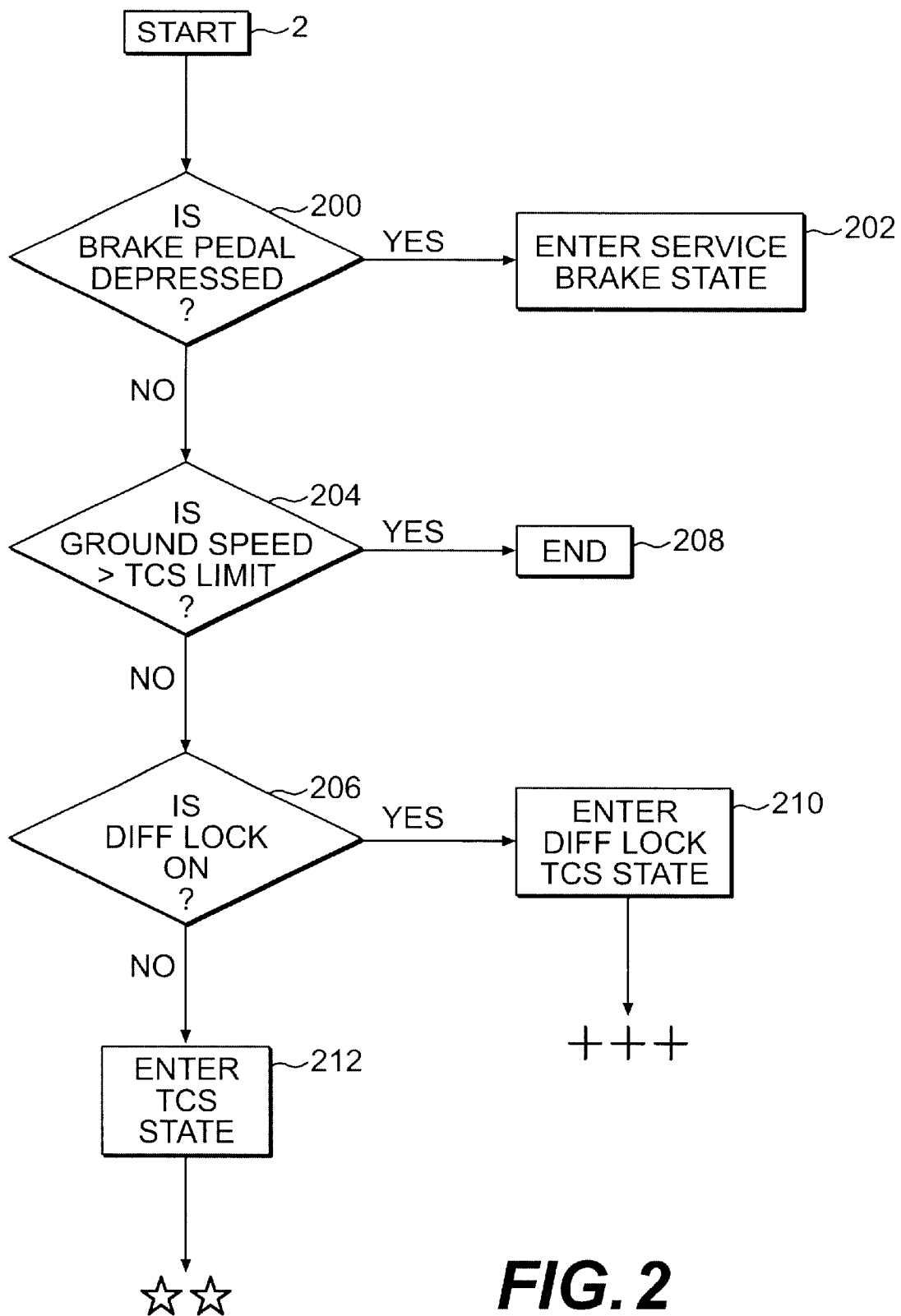
FIG. 2 is a top-level flowchart of one embodiment of an electronic traction control system-of an embodiment of the present invention.

FIG. 2 depicts a flowchart of a preliminary decision process which controls the mode of the electronic traction control system 100. Please note that the electronic traction control system 100 may operate continuously as the machine is running, or may be controlled by an automatic (such as a sensor input or a transmission state) or manual (such as an operator-manipulated input) command. The electronic traction control system 100 will be discussed herein as having discrete and distinct start and end points. One skilled in the art could easily devise an operation scheme in which the electronic traction control system constantly monitors the wheels and produces a brake signal when needed; such an embodiment would fall under the claims of the present invention.

Control begins in FIG. 2, at the START block 2, and proceeds to first decision block 200, where the state of the operator's brake pedal 1162 is determined. If the brake pedal 1162 is depressed, control proceeds to first control block 202 and enters the service brake state without activating the traction control system of the present invention. If the brake pedal 1162 is not depressed, control proceeds to second decision block 204, where the ground speed of the work machine is preferably compared to an optional predetermined maximum traction control speed (TCS_limit). If the ground speed is less than or equal to the maximum traction control speed or if no maximum traction control speed is provided, control proceeds to third decision block 206, where the state of the differential lock mechanism (diff lock) is assessed. If the ground speed is greater than the maximum traction control speed, control proceeds to second control block 208 (END). At third decision block 206, if the differential lock mechanism is engaged, control proceeds to third control block 210, at which point control enters the differential lock traction control state, to be described in more detail below.

Back to the other fork from third decision block 206: if the differential lock 113,115 is not engaged, control passes to fourth control block 212. From fourth control block 212, control next enters the traction control system starting at block 300 of FIG. 3.

Traction Control State

Figure 3:
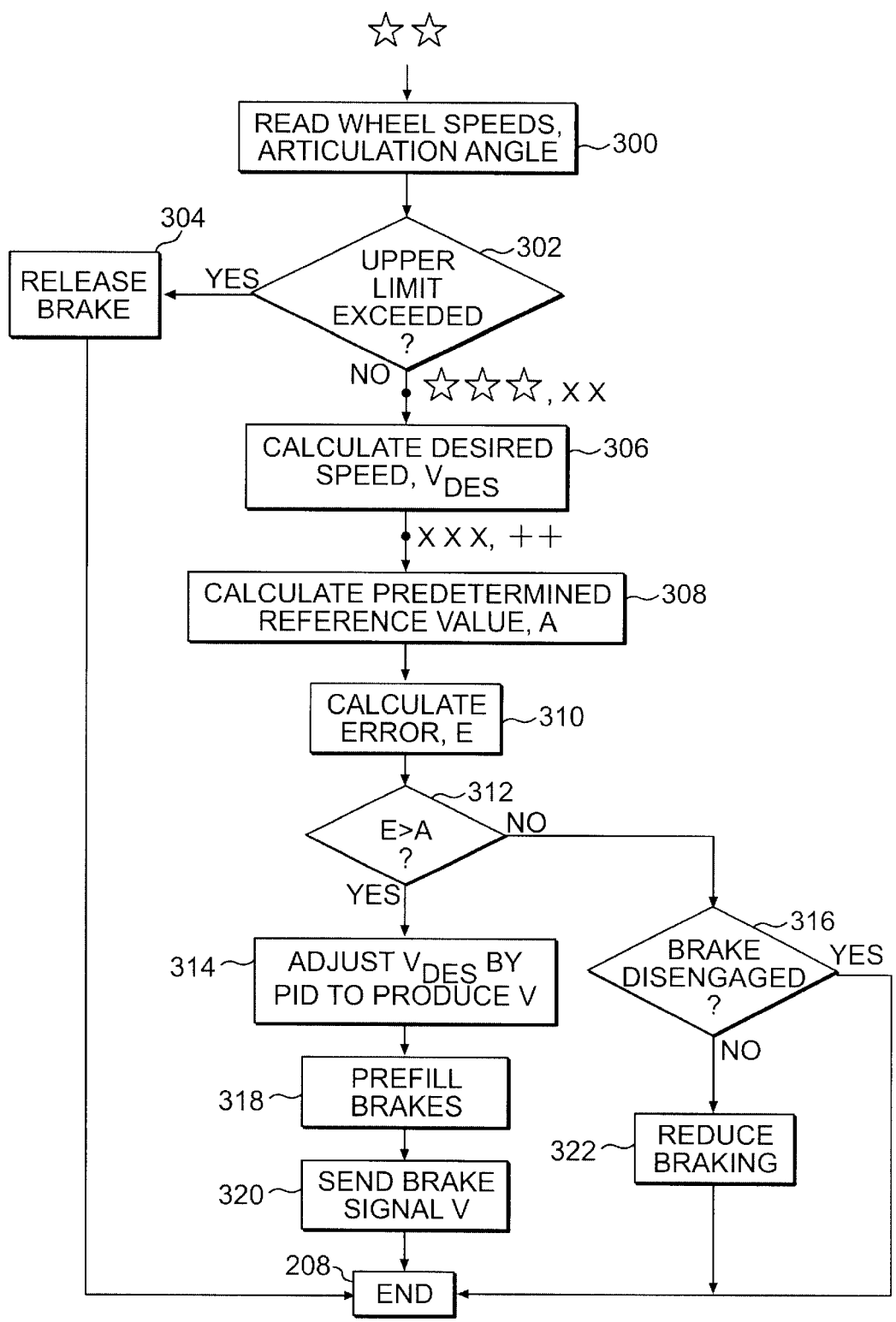
FIG. 3 is a second level flowchart of an embodiment of the present invention.

First control block 300 of FIG. 3 is where the individual wheel speeds ($V_{ACTRR}$, $V_{ACTRF}$, $V_{ACTLR}$, $V_{ACTLF}$) and machine articulation angle ($\theta$) are sampled. As apparent from the flowchart, the wheel speeds and machine articulation angle are sampled on each control loop. As described below, the control is continually adjusting the braking forces in response to the changing machine parameters. After the machine parameters have been sampled, the control preferably passes to first decision block 302 to determine if the machine speed is beyond an optional upper limit established for the wheel-slip control. The upper limit is exceeded if the machine is traveling at greater than a predetermined maximum velocity value, 10 km/hr, for example. The upper limit represents a machine quality such as the maximum machine speed in second gear. If the upper limit is present and is exceeded, then control proceeds to second control block 304 where the inner and outer brakes are released.

Before the desired wheel speed is calculated, several machine parameters must be determined and/or calculated. From first decision block 302, control passes to block 400 in FIG. 4. For the discussion to follow, reference should be made to FIG. 5 which shows graphically many of the machine parameters referenced in the other figures and in the equations.

Figure 4:
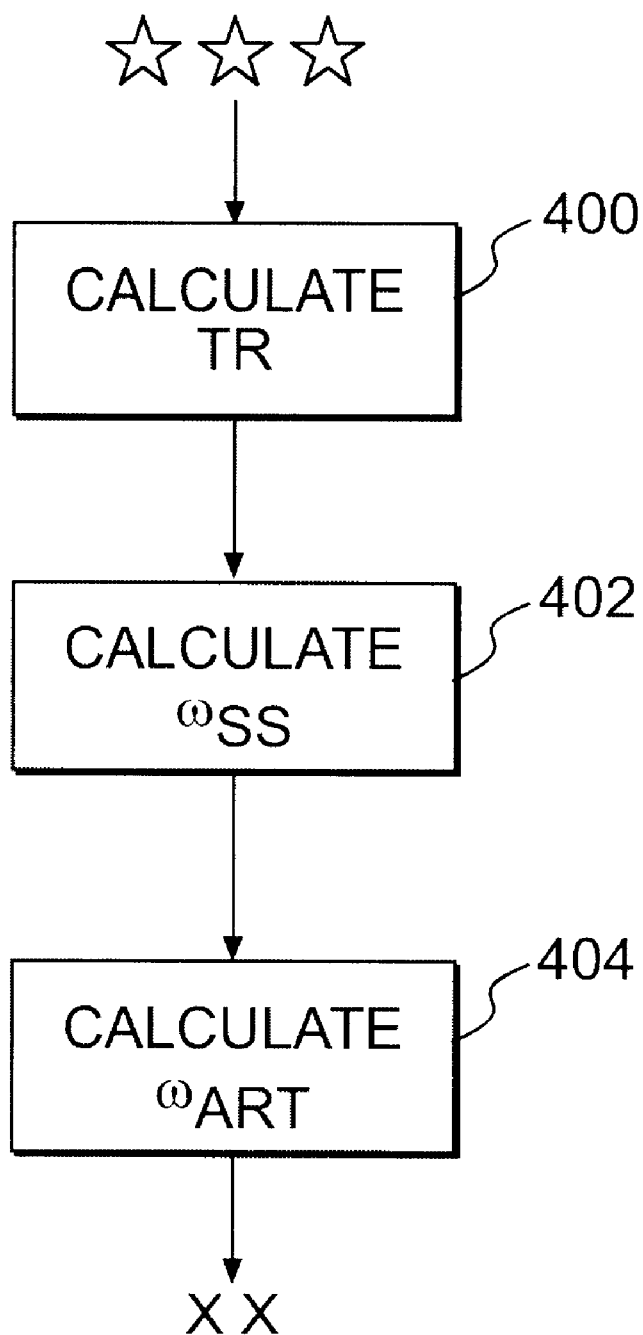
FIG. 4 is a third level flowchart of an embodiment of the present invention.
Figure 5:
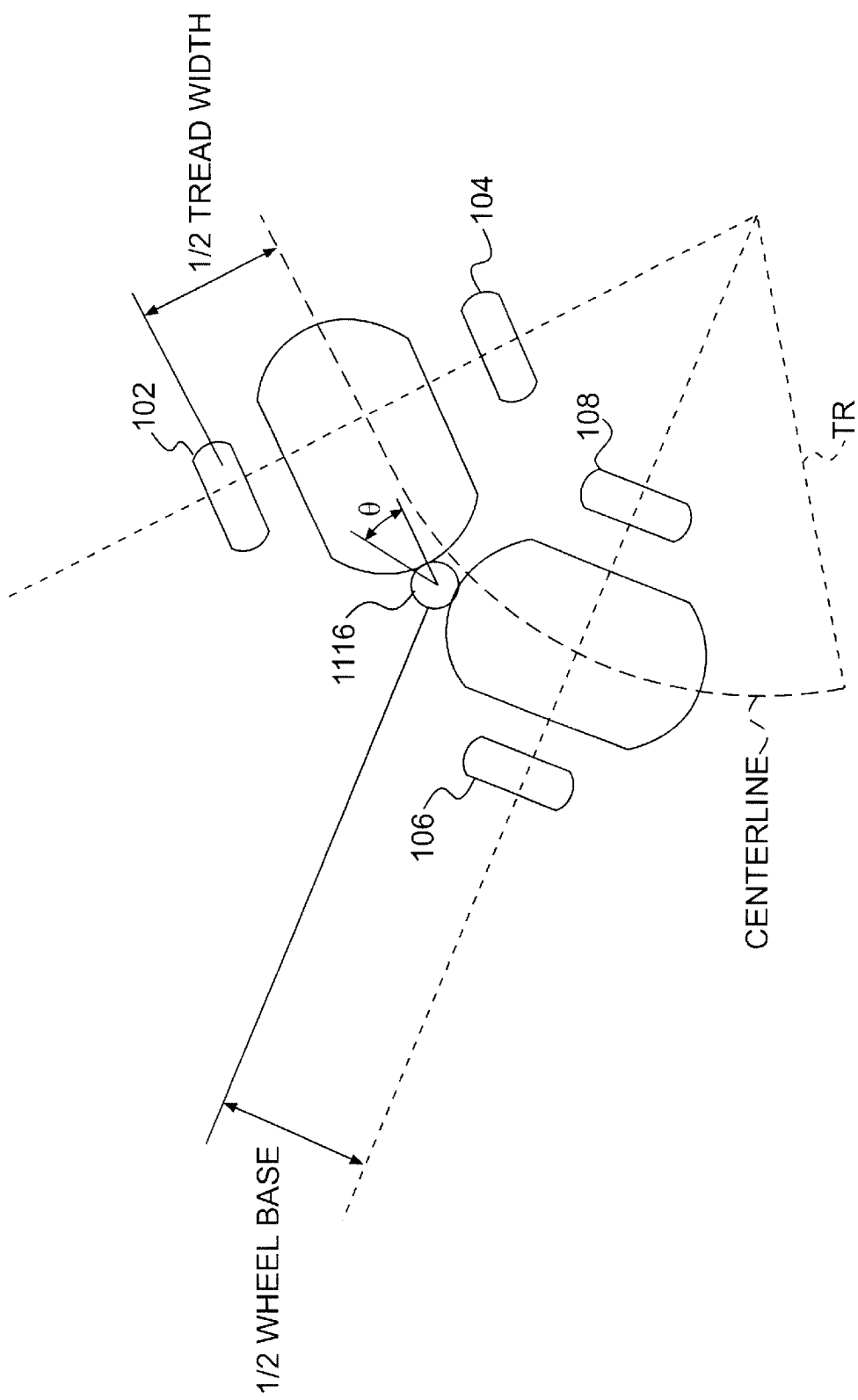
FIG. 5 is a block diagram of the work machine illustrating certain machine nomenclature and characteristics.

Referring now to block 400 of FIG. 4, the machine turning radius, TR, is calculated according the following relationship:

$$TR = 1/2 \text{ WHEEL BASE}/\tan(\theta_{ART}/2)$$

where $\theta_{ART}$=Articulation angle of machine

Next, at second control block 402, the steady state angular velocity of the machine, $\omega_{SS}$ is calculated according to the following relationship:

$$\omega_{SS} = VM/TR$$

where, $VM = ((V_{ACTRR} + V_{ACTRF} + V_{ACTLR} + V_{ACTLF})/4) *$ (rolling radius of the wheels)

Once $\omega_{SS}$ is calculated, control then passes to third control block 404 where the articulation rate of the machine, $\omega_{ART}$, is calculated according to:

$$\omega_{ART} = d\theta_{ART}/dt$$

The control then proceeds back to third control block 306 and where the desired wheel velocity of each wheel, $V_{DES}$, is calculated using equations laid out below. Please note that throughout the equations, RR is the right rear wheel, RF the right front, LR the left rear, and LF the left front. When a variable is described using a chosen one of the wheel position designations RR, RF, LR, or LF, the variable for the other, nonchosen, wheel positions is determined similarly but by replacing the chosen wheel position designation with the corresponding nonchosen wheel position designation. For instance, $V_{SSRF}$ represents a property corresponding to the right front wheel, and $V_{SSLF}$ is the same property, but corresponding to the left front wheel instead.

First, the wheel velocity due to a steady state articulation condition, $V_{SS}$, is calculated according to:

For the left front wheel, $$V_{SSLF} = VM - (\omega_{SS} * \text{TREAD WIDTH}/2)$$

For the left rear wheel, $$V_{SSLR} = V_{SSLF}$$

For the right front wheel, $$V_{SSRF} = VM + (\omega_{SS} * \text{TREAD WIDTH}/2)$$

For the right rear wheel, $$V_{SSRR} = V_{SSRF}$$

Where:

$V_{SSRF}$=Articulation-caused linear velocity of right front wheel, assuming inner differential (that is, front axle speed=rear axle speed), Second, the wheel velocities due to a transient articulation condition (i.e., that provided by the time-varying relative motion of the front and rear frames about the articulation joint), $V_{ART}$, are calculated according to:

For the right front wheel, $$V_{RF} = (\omega_{ART}/2) * ((\text{TREAD WIDTH}/2) - (\text{WHEEL BASE}/2) * \tan(\theta_{ART}/2))$$

$$V_{ARTRF} = (\text{sign of } V_{RF}) * (F_{MIN} * \min(f_{ABS}(V_{RF}), f_{ABS}(V_{LF})) + F_{MAX} * \max(f_{ABS}(V_{RF}), f_{ABS}(V_{LF})))$$

For the left front wheel, $$V_{LF} = -(\omega_{ART}/2) * ((\text{TREAD WIDTH}/2) + (\text{WHEEL BASE}/2) * \tan(\theta_{ART}/2))$$

$$V_{ARTLF} = (\text{sign of } V_{LF}) * (F_{MIN} * \min(f_{ABS}(V_{RF}), f_{ABS}(V_{LF})) + F_{MAX} * \max(f_{ABS}(V_{RF}), f_{ABS}(V_{LF})))$$

For the right rear wheel, $$V_{RR} = -V_{RF}$$

$$V_{ARTRR} = (\text{sign of } V_{RR}) \cdot (F_{MIN} * \min(f_{ABS}(V_{RR}), f_{ABS}(V_{LR})) + F_{MAX} * \max(f_{ABS}(V_{RR}), f_{ABS}(V_{LR})))$$

For the left rear wheel, $$V_{LR} = -V_{LF}$$

$$V_{ARTLR} = (\text{sign of } V_{LR}) * (F_{MIN} * \min(f_{ABS}(V_{RR}), f_{ABS}(V_{LR})) + F_{MAX} * \max(f_{ABS}(V_{RR}), f_{ABS}(V_{LR})))$$

where (sign of $V_{RF}$)=+1 or −1, depending upon the positive/negative value of $V_{RF}$, $V_{RF}$=articulation rate-caused wheel speed of right front wheel with inter-axle differential (front axle speed ≠ rear axle speed), $f_{ABS}$=floating point absolute, $V_{ARTRF}$=articulation rate-caused linear velocity of right front wheel, no inter-axle differential (front axle speed=rear axle speed), $F_{MIN}$=A predetermined load-based factor for minimum speed wheel (the likelihood that the faster wheel will slip when articulating), and $F_{MAX}$=A predetermined load-based factor for maximum speed wheel (=1−$F_{MIN}$), the likelihood that the slower wheel will slip when articulating.

The values of $F_{MIN}$ and $F_{MAX}$ range from 0 to 1, are taken from a predetermined lookup table, formula, or equation, and are based on individual machine parameters and a sensed value for the variable load carried by the work machine. $F_{MIN}$ and $F_{MAX}$ bias the wheel velocity to account for the variable load causing a variable weight distribution to the wheels; the exact values of $F_{MIN}$ and $F_{MAX}$ are not essential to the present invention and may be easily determined by those skilled in the art.

Finally, the desired wheel speeds are calculated according to the following relationship:

For the left front wheel, $$V_{DESLF} = V_{SSLF} + V_{ARTLF}$$

For the right front wheel, $$V_{DESRF} = V_{SSRF} + VARTRF$$

For the left rear wheel, $$V_{DESLR} = V_{SSLR} + V_{ARTLR}$$

For the right rear wheel, $$V_{DESRR} = V_{SSRR} + V_{ARTRR}$$

Figure 6:
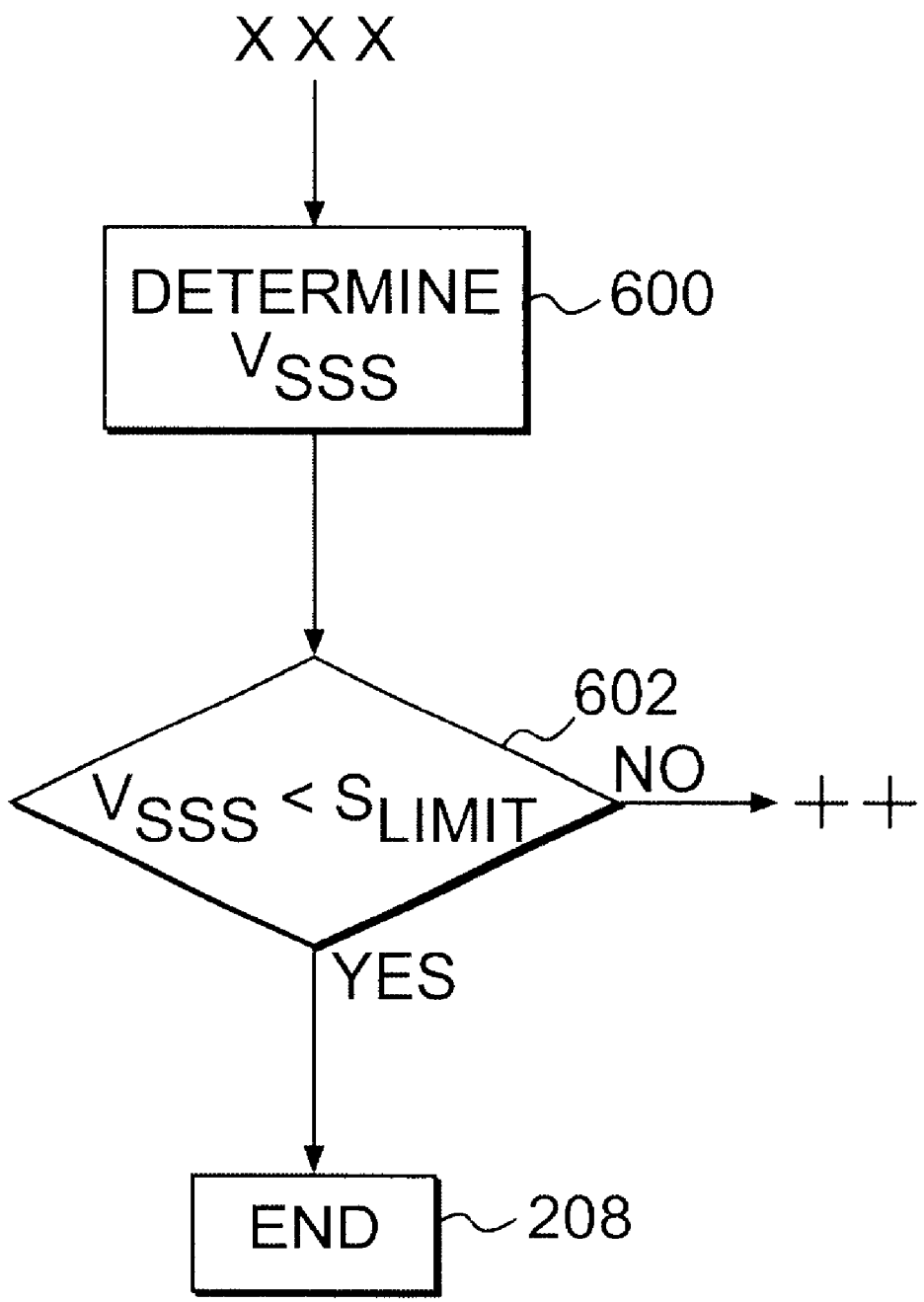
FIG. 6 is a third level flowchart of an embodiment of the present invention.

Once the machine parameters and the desired wheel speeds are calculated, the control transfers to first control block 600 of FIG. 6, where the machine parameters are compared to the working range of the wheel slip control.

Referring to first control block 600 of FIG. 6, the steady state wheel velocity, $V_{SSS}$, is determined as the minimum of all desired wheel speeds. Once the steady state wheel velocity, $V_{SSS}$, is determined, the control proceeds to first decision block 602 where $V_{SSS}$ is compared to the lower limit velocity value, S limit. S limit represents a predetermined value of a threshold for effective electronic traction control system 100 operation and may have a value of 1.5 km/h, for example. If $V_{SSS}$ is found to be less than S limit, then the assumption is that the wheel speeds are too low for the traction control system to function properly and the electronic traction control system 100 takes no action, control returning to eighth decision block 208 of FIG. 2 for an end to the program logic. Otherwise, the machine parameters are said to be within the working range of the electronic traction control system 100.

After performing the logic in FIG. 6 and achieving a "no" result in first decision block 602, the control returns to fourth control block 308 shown in FIG. 3. At fourth control block 308, a predetermined reference value, A, is determined from a preset list of values dependent upon any number of system characteristics or, preferably and for better accuracy, calculated using the following:

$$A = |\omega_{ART}|/2 * \text{WHEEL BASE}/2 * |\tan(\theta_{ART}/2)| + K_{DB}$$

where $K_{DB}$=constant value representing lower sensing limit of wheel speed sensors (~0.5 rpm or else as provided for a specific sensor type). A symbolizes the maximum possible error between the desired and measured wheel speeds without loss of traction. Such an error may exist due to factors such as sensor measurement error, machine dynamics, and differences between the actual and assumed wheel speed biases during transient articulation.

Control then passes to fifth control block 310, where an error value, E, is produced. E represents the difference between the actual wheel speed and the desired wheel speed:

$$E = |V_{ACT} - V_{DES}| \quad \text{(for each wheel)}$$

At second decision block 312, the error value, E, is compared to the predetermined reference value, A. If the E is greater than A, control continues to sixth control block 314. Otherwise the control proceeds to third decision block 316.

At sixth control block 314, braking forces for the faster rotating or slipping wheel are adjusted using a Proportional-Integral-Derivative ("PID") technique. PID is commonly used to modulate and smooth the response of an electronic control system. In the current invention, PID acts to transform the wheel speed error (E) value into a brake command signal (V).

Figure 7:
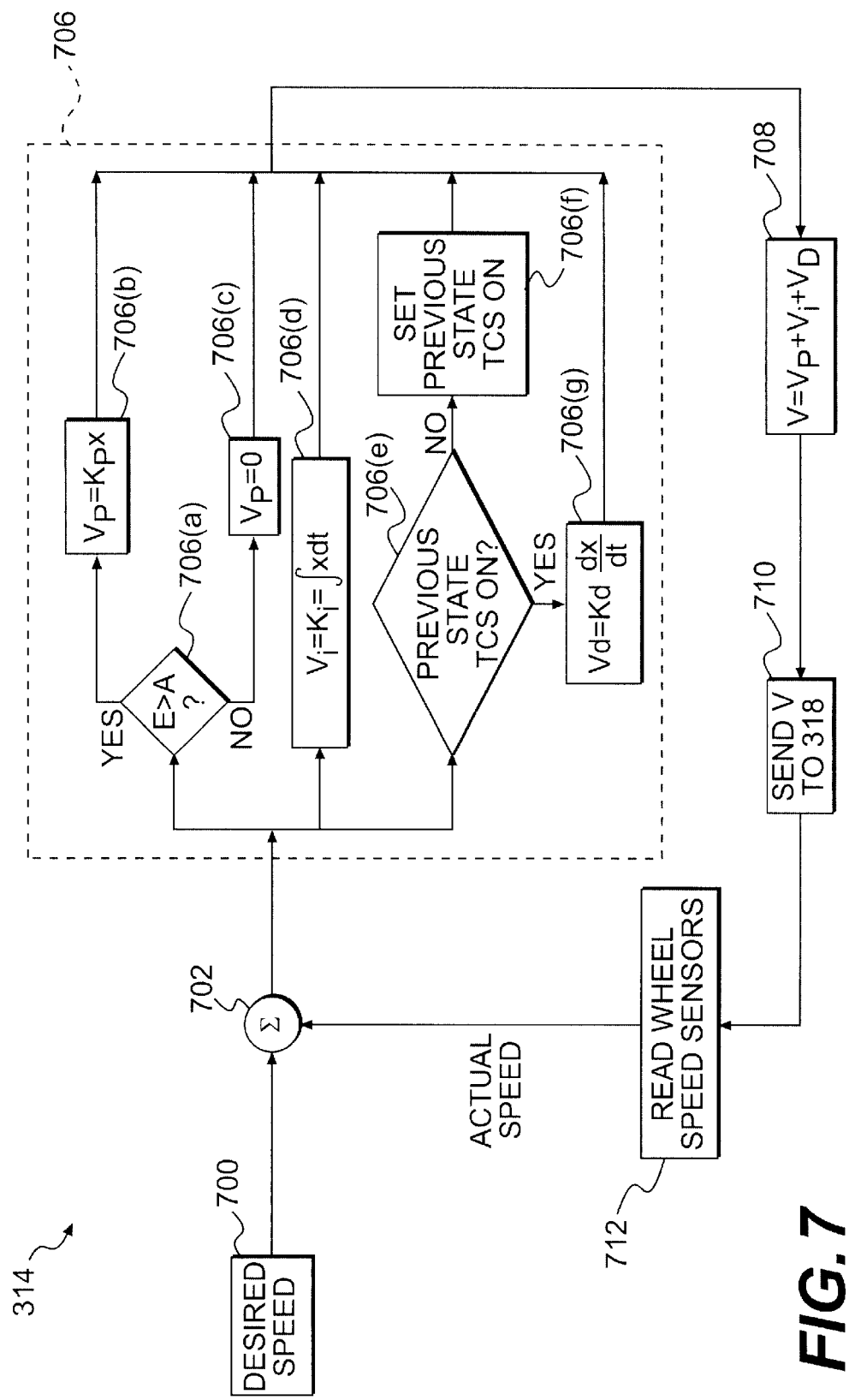
FIG. 7 is a third level flowchart of an embodiment of the present invention.

FIG. 7 depicts a sample of a block diagram of a PID control loop which could be performed at sixth control block 314. The desired wheel speed, $V_{DES}$, is input at first control block 700. At the summing junction 702, the desired wheel speed and actual wheel speed are read and the E and A values are calculated. Control then enters the PID block, shown generally at 706, where $V_P$, $V_I$, and $V_d$ are calculated using PID, preferably by the equations:

$$V_p = K_p X$$

$$V_i = K_i \int X dt$$

$$V_d = K_d dX/dt$$

where X=E−A, or by any other suitable PID format.

The values of the constants $K_p$, $K_i$, and $K_d$ are determined from simulation and analysis of empirical data in response to under footing conditions, machine dynamics, type of work performed by the machine, etc. For example, the values of the constants $K_p$, $K_i$, and $K_d$ may be on the order of 1.0, 0.5, and 1.0, respectively. It will be readily apparent to those skilled in the art that the PID constant values may be any of a wide range of numerical values depending on the desired gain of the feedback system and may be readily determined experimentally for a given traction control system.

At first decision block 706(*a*), E and A are compared. If E is larger than A, then control passes to second decision block 706(*b*), where the proportional section, $V_p$, of the PID is calculated. If E is equal to or smaller than A, control passes to third control block 706(*c*), and $V_p$ is set to zero. This zeroing out assists in fine-tuning the response of the system by avoiding a deceptive $V_p$ component in cases where the error is approaching a physical limit of the system.

At or about the same time as control enters the proportional aspect of the PID loop at first decision block 706(*a*), the integral portion $V_i$ is calculated at fourth control block 706(*d*), and control enters a derivative portion of the PID loop at second decision block 706(*e*). At second decision block 706(*e*), the previous state of the control is evaluated. If the previous state of the control is not traction control system activated, the derivative portion of the PID is skipped and the previous state is set to traction control system on at fifth control block 706(*f*). This portion of the PID loop is intended to prevent artificially large values in the derivative portion due to the sudden initiation of the logic of third or fourth control blocks 210,212. Optionally, the PID loop may be run for several cycles without running the derivative portion of the control. Only one cycle is shown by the "previous state" logic of FIG. 7 but it is well-known to skip a portion of a loop for several cycles through the use of an incremented variable. If the previous state is that the traction control system was activated, control proceeds to sixth control block 706(*g*) and the derivative portion of the PID is activated.

The PID block 706 sends outputs $V_p$, $V_i$, and $V_d$ to seventh control block 708 and V, the brake signal, is calculated. V can be represented by the equation, $V = V_p + V_i + V_d$. From seventh control block 708, control passes to eighth control block 710 and the final V value is sent back to the main program. It should be noted that the logic of FIG. 7 takes place within sixth control block 314 of FIG. 3. After generating the brake command signal and sending it back to the main program of FIG. 3 at eighth control block 710, control then passes to ninth control block 712, where the wheel speed is read once more from the wheel speed sensors 1106,1108,1110,1112 and the actual wheel speed is sent to the summing junction 702 to re-start the PID loop.

The closed loop of FIG. 7 illustrates that in response to the error value, E, the PID control calculates the braking forces necessary to reduce the error value, E, to the first predetermined reference value, A. V is calculated by the FIG. 7 loop and sent to sixth control block 314 in FIG. 3 until E becomes equal to or less than A. At that point, traction will be considered to have been regained and the electronic traction control system 100 will not be needed until the next slipping event.

With reference to the seventh control block 318 shown in FIG. 3, the braking system is supplied a sufficient amount of hydraulic fluid to build the pressure before the service brakes 118,120,122,124 are applied, an operation known as "pre-fill". This is accomplished by energizing the safety and service valves 150,154,126,128,134,136 to fill the braking system with pressurized fluid. Pre-filling the service brakes 118,120,122,124 substantially removes any time lag between the moment that the braking control signal is issued and the moment in which the brake 118,120,122,124 is applied. For example, the safety and service valves 150,154, 126,128,134,136 may be energized for a time period of 100 ms or for such time as to achieve a desirable fluid pressure. It should be apparent that once braking has initiated there is no ongoing need to pre-fill the braking system and seventh control block 318 may include an instruction to skip the prefill step if the brake pressure is adequate. Control then proceeds to eighth control block 320 and the brake signal V is sent to the brakes.

Returning to second decision block 312 in FIG. 3, if E is not greater than A—that is, if the slipping wheel(s) 102,104, 106,108 are no longer considered to be slipping—control proceeds to third decision block 316, where the engaged/disengaged state of the brakes 118,120,122,124 is evaluated. If the brakes 118,120,122,124 are disengaged, control returns to first command block 300 and starts over. If the brakes 118,120,122,124 are engaged at third decision block 316, control proceeds to ninth control block 322. At ninth control block 322, the braking is reduced by sending a new brake command signal with a value of either less than the previous brake command signal or zero and control then returns to first command block 300 and starts over. The purpose of the third decision block 316-ninth control block 322 loop is to disengage the brakes 118,120,122,124 when the electronic traction control system is no longer needed. From second, eighth, or ninth control blocks 304,320,322 or from third decision block 320, control returns to the END block, element 208 of FIG. 2.

Differential Lock Traction Control System

If the third decision block 206 of FIG. 2 indicates that the ground speed of the machine is less than the TCS limit, control proceeds to third control block 210, and the machine enters the differential lock traction control system state. The differential lock traction control system is simply a version of the electronic traction control system 100 which operates in conjunction with the differential lock 110,112.

Figure 8:
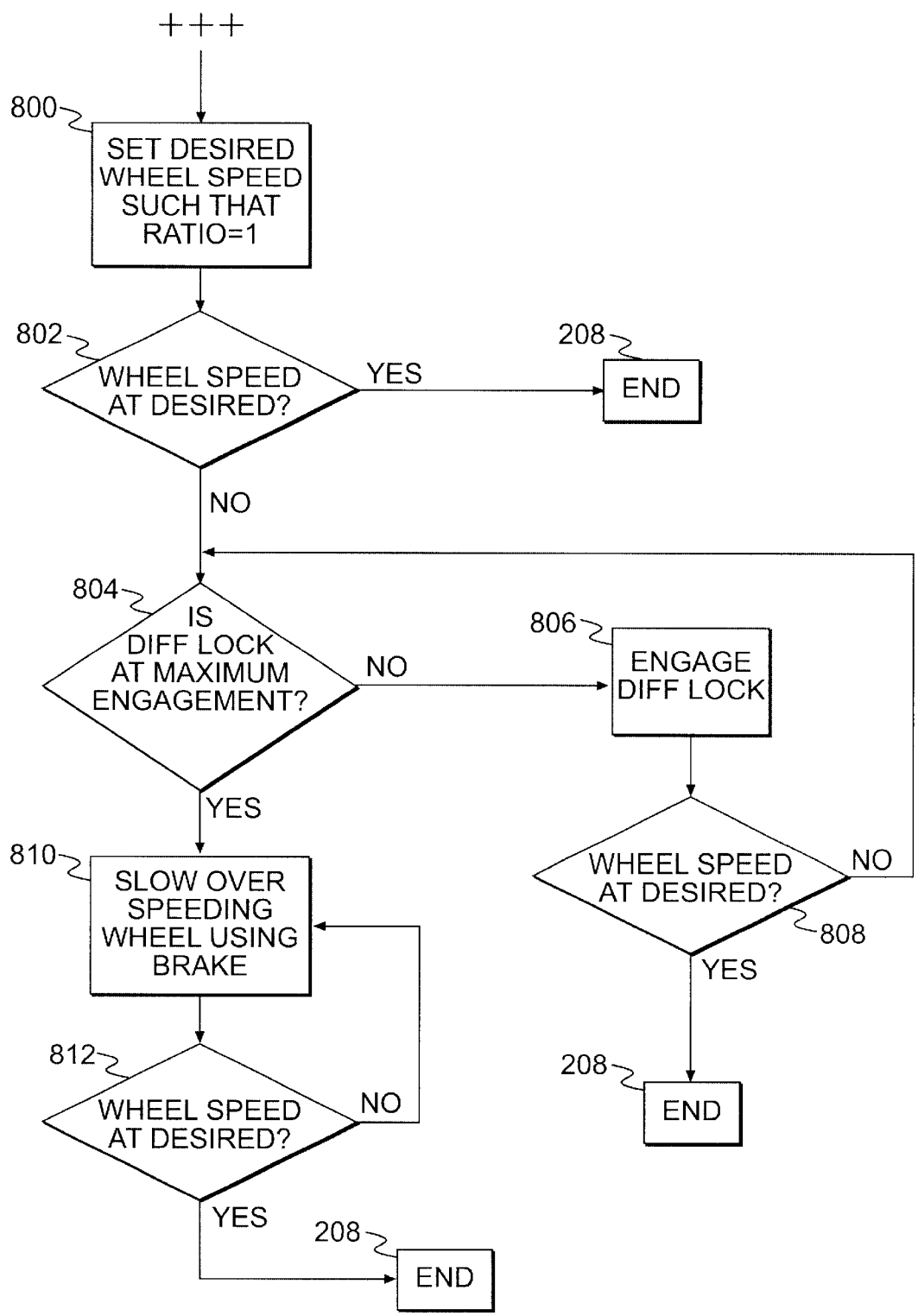
FIG. 8 is a second level flowchart of an embodiment of the present invention.

At first control block 800 of FIG. 8, the desired wheel speeds are set such that a ratio of the desired wheel speeds of the two wheels 102,104,106,108 which share an axle 114,116 is equal to 1. Control then proceeds to first decision block 802 and checks the wheel speed against a desired wheel speed. If the wheel speed is as desired, control returns to the END block 208 in FIG. 2. If the wheel speed is not at the desired wheel speed, control proceeds from first decision block 802 to second decision block 804, where the engagement of the differential lock ("diff lock") 110,112 is investigated. If the differential lock 110,112 is not at maximum engagement, the wheel slip torque has presumably overcome and partially disengaged the differential lock 110,112. In that case, the differential lock 110,112 is engaged, usually through hydraulic pressure, at second control block 806. Control then proceeds to third decision block 808, where the wheel speeds are again compared to the desired wheel speeds. If the wheel speeds are not at the desired values, control repeats the logic of second decision block 804. Otherwise, the wheel speed must have been brought under control by the differential lock 110,112 at second control block 806, and control proceeds to the END block 208 in FIG. 2.

If the differential lock 110,112 is already at maximum engagement in second decision block 804, control proceeds to third control block 810. At third control block 810, the service brakes 118,120,122,124 are activated to slow the overspeeding wheel(s) 102,104,106,108 to the desired wheel speed. Control then proceeds to fourth decision block 812, at which the wheel speed is once more compared to the desired wheel speed. If the two are equal, control ends the differential lock traction control system at the END block 208 of FIG. 2. If the two speeds are different, control returns to third control block 810 and continues to slow the overspeeding wheel until the wheels sharing an axle have a speed ratio of 1.

General Operation and Actuation

It should be remembered that the electronic traction control system 100 may be activated in a number of different ways. For instance, the electronic control module 1118,1120 could operate automatically to detect and eliminate a slipping condition of the wheels at all times, the operator could manually actuate the electronic traction control system 100 under certain work conditions, or the like. The exact method of actuation of the electronic traction control system 100 is not crucial to the present invention.

From the foregoing it is apparent that the electronic traction control system 100 operates to detect a slipping wheel 102,104,106,108, apply braking force to the slipping wheel 102,104,106,108, and periodically and incrementally modulate the braking force in accordance with the degree of slip which is detected by the electronic traction control system 100.

It will be evident to those skilled in the art to delay certain portions of the control within the various control algorithms disclosed with respect to the present invention. For example, a delay may filter out short term wheel slip aberrations. However, this is not critical to the present invention.

It is noted that values described herein are for exemplary purposes only. It will be apparent to those skilled in the art that any of the illustrated values may be modified depending upon the desired effects.

Industrial Applicability

The present invention is well suited toward regulating the wheel-slip of an articulated machine such as a wheel loader. It will however, be apparent to those skilled in the art that the present invention is not limited to a wheel loader, as the present invention is well suited to many other types of articulated machines.

As set forth above, the wheel-slip control of the present invention senses the individual wheel speeds and calculates a desired wheel speed value. Based on feedback control, an error value is determined. In response to the magnitude of the error value, the control determines the proper braking forces needed to eliminate wheel slip and commands the brakes to apply those forces. The brake forces are incrementally modulated with each loop of the control for smooth transitions from the initial braking force to the final braking force.

It should be appreciated by one skilled in the art that using PID feedback control provides a more desirable braking control. The $V_p$ term of the PID control leads to a proportional gain which provides for a fast response. The $V_i$ term of the PID control cancels any offset in error introduced by the $V_p$ term. The $V_d$ term dampens the response, providing for control stability. Thus, the result provides for a wheel-slip control which eliminates wheel-slip quickly and without the undesirable effects of brake "pulsing". Thus, the PID control accurately determines the magnitude and the rate at which the braking force is to be applied.

As shown, the present invention is particularly suited to machines that are articulated and have two sets of axles for driving at least two wheels for each axle set. Moreover, the present invention measures the articulation angle of the machine, calculates the articulation rate, and adjusts the slip signal value to account for the normal wheel speed differential associated with each axle set during cornering, as well as compensating for movement of the articulation joint during articulation and for the variable load carried by the machine. Further, the electronic traction control system independently monitors wheel-slip, providing for efficient machine operation.

Other aspects, objects and advantages of the present invention can be obtained from a study of the drawings, the disclosure and the appended claims.

What is claimed is:

1. An electronic traction control system for a work machine having a front frame, a rear frame, and an articulation joint connecting the front and rear frames, the system comprising:
   an articulation sensor adapted to provide an articulation angle signal;
   at least two wheels, with each wheel adapted to provide a wheel speed signal;
   a brake associated with the work machine;
   an electronic control module adapted to receive the articulation angle and wheel speed signals; calculate an articulation rate responsive to the articulation angle signal; determine a desired wheel speed having at least one of: an articulation-caused linear velocity component calculated responsive to the articulation rate, articulation angle, and wheel speed signals, and a transient articulation-caused velocity component calculated responsive to the articulation rate, articulation angle, and wheel speed signals; and responsively produce a brake signal to control the brake.

2. The electronic traction control system of claim 1, including a load sensor which produces a load signal and wherein the electronic control module also determines the desired wheel speed relative to the load signal.

3. The electronic traction control system of claim 1, wherein the brake signal controls one or more of the brakes to apply braking forces to at least one wheel having a speed greater than the desired wheel speed.

4. The electronic traction control system of claim 1, wherein the electronic control module calculates a wheel speed error value responsive to the wheel speed signals and the desired wheel speed, and a magnitude of the brake signal is dependent on, and directly proportional to, a magnitude of the wheel speed error value.

5. The electronic traction control system of claim 1, wherein the electronic control module calculates a reference value based on the articulation angle signal, the articulation rate calculated responsive to the articulation angle signal, and a machine speed calculated responsive to the wheel speeds.

6. The electronic traction control system of claim 5, wherein the electronic control module calculates a wheel speed error value responsive to at least one of the wheel speed signal and to the desired wheel speed and compares the reference value to the wheel speed error value, wherein the brake signal is responsively controlled to bring the wheel speed error value closer to the reference value when the wheel speed error value is greater than the reference value.

7. The electronic traction control system of claim 1, including a differential lock having a differential lock engagement value and wherein the electronic control module controls the differential lock to bring the differential lock engagement value to a predetermined maximum engagement value.

8. An electronic traction control system for a work machine having front and rear frames connected by an articulation joint for relative pivotal movement, each frame having at least one driven wheel, comprising:
   an articulation sensor associated with the articulation joint and adapted to produce an articulation angle signal;
   a wheel speed sensor associated with each wheel, each adapted to produce a wheel speed signal;
   an electronic control module adapted to receive the articulation angle signal and the wheel speed signals, determine a measured wheel velocity value responsive to each wheel speed signal, determine an articulation rate value responsive to the articulation angle signal, calculate an articulation-caused linear velocity value for each wheel responsive to the articulation angle, articulation rate, and wheel speed signals and a transient articulation-caused velocity value for each wheel responsive to the articulation angle, articulation rate, and wheel speed signals, calculate a desired wheel velocity value for each wheel responsive to the articulation-caused linear velocity value and the transient articulation-caused velocity value, calculate an error value responsive to the measured wheel velocity value and the desired wheel velocity value, and produce a brake signal for each wheel responsive to the error value; and
   a brake associated with each wheel adapted to receive the brake signal and actuate responsively thereto.

9. The electronic traction control system of claim 8, wherein the brake is controlled by the brake signal using a proportional-integral-derivative control.

10. The electronic traction control system of claim 8, including a load sensor adapted to measure a variable load carried by the work machine and produce a load signal, and wherein the desired wheel velocity value is also calculated responsive to the load signal.

11. The electronic traction control system of claim 8, including a differential lock associated with at least one wheel and having a differential lock engagement value, wherein an engagement of the differential lock is controlled responsive to the differential lock engagement value being less than a maximum.

12. A method of controlling wheel slip of an articulated work machine, comprising:
   comparing the relative positioning of a front frame and a rear frame of the work machine and responsively producing an articulation angle signal;
   sensing a speed of at least one wheel associated with at least one of the front and rear frames and responsively producing a wheel speed signal;
   receiving the articulation angle signal and each wheel speed signal;
   producing a wheel speed value responsive to each wheel speed signal;
   determining a rate of change of the articulation angle signal and responsively producing an articulation rate value;
   producing an articulation-caused linear velocity value responsive to the articulation angle signal, the articulation rate value, and each wheel speed signal;

producing a transient articulation-caused velocity value responsive to the articulation angle signal, the articulation rate value, and each wheel speed signal;

producing a desired wheel speed value based on the articulation-caused linear and transient articulation-caused velocity values;

comparing the wheel speed value to the desired wheel speed value;

producing a brake signal responsive to the difference between the actual wheel speed value and the desired wheel speed value; and controlling a brake associated with each wheel responsive to the brake signal.

13. The method of claim 12, wherein the step of producing the actual wheel speed value includes the steps of:

producing a articulation-caused linear velocity value responsive to the articulation angle signal and a calculated steady-state angular velocity value;

producing a transient articulation-caused velocity value responsive to the articulation angle and articulation rate signals; and producing the desired wheel speed value as a sum of the articulation-caused linear velocity value and the transient articulation-caused velocity value.

14. The method of claim 12, including the step of sensing a variable machine load and responsively producing a load signal, and wherein the step of producing the desired wheel speed value includes calculating the desired wheel speed value responsive to the load signal.

15. The method of claim 12, including the step of sensing a differential lock engagement and controlling the differential lock to bring the differential lock engagement to a predetermined maximum engagement.

16. An electronic traction control system for a work machine having a front frame, a rear frame, and an articulation joint connecting the front and rear frames, the system comprising:

an articulation sensor adapted to provide an articulation angle signal $\theta_{ART}$;

four wheels, with each wheel adapted to provide a wheel speed signal $V_{ACTRR}$, $V_{ACTRF}$, $V_{ACTLR}$, or $V_{ACTLF}$;

a brake associated with the work machine;

an electronic control module adapted to receive the articulation angle and wheel speed signals $\theta_{ART}$, $V_{ACTRR}$, $V_{ACTRF}$, $V_{ACTLR}$, and $V_{ACTLF}$; calculate an articulation rate using $\omega_{ART}=d\theta_{ART}/dt$; determine a desired wheel speed $V_{DES}$; and responsively produce a brake signal to control the brake, wherein the desired wheel speed $V_{DES}$ for each wheel is calculated using the following equations:

a machine turning radius, $TR$, is calculated by $TR=1/2$ WHEEL BASE/tan$(\theta_{ART}/2)$;

a steady state angular velocity of the machine, 107 $_{SS}$, is calculated by $\omega_{SS}=VM/TR$ where, $VM=((V_{ACTRR}+V_{ACTRF}+V_{ACTLR}+V_{ACTLF})/4)*$(rolling radius of the wheels);

a wheel velocity due to a steady state articulation condition is calculated by $V_{SSLF}=VM-(\omega_{SS}*\text{TREAD WIDTH}/2)$ $V_{SSLR}=V_{SSLF}$ $V_{SSRF}=VM+(\omega_{SS}*\text{TREAD WIDTH}/2)$ $V_{SSRR}=V_{SSRF}$;

a wheel velocity due to a transient articulation condition is calculated by $V_{RF}=(\omega_{ART}/2)*((\text{TREAD WIDTH}/2)-(\text{WHEEL BASE}/2)*\tan(\theta_{ART}/2))$ $V_{ARTRF}=(\text{sign of } V_{RF})*(F_{MIN}*\min(f_{ABS}(V_{RF}), f_{ABS}(V_{LF}))+F_{MAX}*\max(f_{ABS}(V_{RF}), f_{ABS}(V_{LF})))$ $V_{LF}=-(\omega_{ART}/2)*((\text{TREAD WIDTH}/2)+(\text{WHEEL BASE}/2)*\tan(\theta ART/2))$ $V_{ARTLF}=(\text{sign of } V_{LF})*(F_{MIN}*\min(f_{ABS}(V_{RF}), f_{ABS}(V_{LF}))+F_{MAX}*\max(f_{ABS}(V_{RF}), f_{ABS}(V_{LF})))$ $V_{RR}=V_{RF}$ $V_{ARTRR}=(\text{sign of } V_{RR})*(F_{MIN}*\min(f_{ABS}(V_{RR}), f_{ABS}(V_{LR}))+F_{MAX}*\max(f_{ABS}(V_{RR}), f_{ABS}(V_{LR})))$ $V_{LR}=-V_{LF}$ $V_{ARTLR}=(\text{sign of } V_{LR})*(F_{MIN}*\min(f_{ABS}(V_{RR}), f_{ABS}(V_{LR}))+F_{MAX}*\max(f_{ABS}(V_{RR}), f_{ABS}(V_{LR})))$; and $V_{DESLF}=V_{SSLF}+V_{ARTLF}$ $V_{DESRF}=V_{SSRF}+V_{ARTRF}$ $V_{DESLR}=V_{SSLR}+V_{ARTLR}$ $V_{DESRR}=V_{SSRR}+V_{ARTRR}$.

* * * * *

UNITED STATES PATENT AND TRADEMARK OFFICE
CERTIFICATE OF CORRECTION

PATENT NO.    : 6,631,320 B1
DATED         : November 27, 2002
INVENTOR(S)   : Bradford J. Holt et al.

It is certified that error appears in the above-identified patent and that said Letters Patent is hereby corrected as shown below:

<u>Column 16,</u>
Line 6, delete "107$_{SS}$" and insert -- $\omega_S$ --
Line 22, delete "θART/2" and insert -- $\theta_{ART}/2$ --
Line 25, delete "$V_{RR}$-$V_{RF}$" and insert -- $V_{RR}$=- $V_{RF}$ --

Signed and Sealed this

Twentieth Day of January, 2004

JON W. DUDAS
*Acting Director of the United States Patent and Trademark Office*